US011996204B1

(12) United States Patent
Reid et al.

(10) Patent No.: US 11,996,204 B1
(45) Date of Patent: May 28, 2024

(54) MULTI-DIRECTIONAL HEAT PIPES

(71) Applicant: Triad National Security, LLC, Los Alamos, NM (US)

(72) Inventors: Robert S. Reid, Los Alamos, NM (US); Felicity A. Kubic, Los Alamos, NM (US); Katrina M. Sweetland, Los Alamos, NM (US)

(73) Assignee: TRIAD NATIONAL SECURITY, LLC, Los Alamos, NM (US)

(*) Notice: Subject to any disclaimer, the term of this patent is extended or adjusted under 35 U.S.C. 154(b) by 113 days.

(21) Appl. No.: 16/822,486

(22) Filed: Mar. 18, 2020

Related U.S. Application Data

(60) Provisional application No. 62/823,756, filed on Mar. 26, 2019.

(51) Int. Cl.

| | |
|---|---|
| ***G21C 15/257*** | (2006.01) |
| ***G21C 15/18*** | (2006.01) |
| *F28D 15/02* | (2006.01) |

(52) U.S. Cl.
CPC ......... *G21C 15/257* (2013.01); *G21C 15/182* (2013.01); *F28D 15/0275* (2013.01)

(58) Field of Classification Search
CPC ....... G21C 15/257; F28D 15/02; F28D 15/04; F28D 15/257; F28D 15/0275
See application file for complete search history.

(56) References Cited

U.S. PATENT DOCUMENTS

| | | | | |
|---|---|---|---|---|
| 1,690,108 A * | 11/1928 | Grady | F28D 15/0275 | 165/104.19 |
| 3,668,070 A * | 6/1972 | Fiebelmann | G21C 15/02 | 376/288 |
| 4,245,380 A * | 1/1981 | Maxson | F25B 23/006 | 29/890.032 |
| T101,204 I4 * | 11/1981 | Hampel | G21D 5/02 | 376/221 |
| 4,851,183 A * | 7/1989 | Hampel | F28D 15/00 | 376/274 |
| 5,195,575 A * | 3/1993 | Wylie | F28D 15/06 | 165/132 |
| 10,643,756 B2 * | 5/2020 | McClure | G21C 1/02 | |
| 10,910,116 B2 * | 2/2021 | Mckellar | G21C 15/257 | |
| 2010/0040187 A1 * | 2/2010 | Ahlfeld | G21C 5/18 | 376/367 |

(Continued)

FOREIGN PATENT DOCUMENTS

| | | | |
|---|---|---|---|
| EP | 3301391 B1 * | 9/2020 | F28D 15/02 |
| KR | 20150010121 A * | 1/2015 | |

OTHER PUBLICATIONS

El-Genk, Mohamed S., and Jean-Michel P. Tournier. "Reliable and safe thermal coupling of Generation-IV VHTR to a hydrogen fuel production complex." Thermal Science and Engineering Progress 3 (2017): 164-170. (Year: 2017).*

(Continued)

*Primary Examiner* — Lily C Garner
(74) *Attorney, Agent, or Firm* — Alston & Bird LLP

(57) ABSTRACT

An apparatus includes a reactor core with one or more heat pipes passing through in an x-direction, one or more heat pipes passing through in a y-direction, and one or more heat pipes passing through in a z-direction. The one or more heat pipes passing through in the z-direction are pumped heat pipes.

6 Claims, 13 Drawing Sheets

(56) References Cited

U.S. PATENT DOCUMENTS

| | | | | |
|---|---|---|---|---|
| 2010/0119027 A1* | 5/2010 | Peterson | G21C 7/32 376/219 |
| 2012/0051481 A1* | 3/2012 | Shu | G21C 5/02 376/174 |
| 2018/0033501 A1* | 2/2018 | Kimura | G21C 3/22 |
| 2018/0268950 A1* | 9/2018 | Mckellar | G21D 1/006 |

OTHER PUBLICATIONS

Beckert, Konrad, and Heinz Herwig. "Inclined air to air heat exchangers with heat pipes: comparing experimental data with theoretical results." IECEC 96. Proceedings of the 31st Intersociety Energy Conversion Engineering Conference. vol. 2. IEEE, 1996. (Year: 1996).*

* cited by examiner

MULTI-DIRECTIONAL HEAT PIPES

CROSS-REFERENCE TO RELATED APPLICATION

This application claims the benefit of U.S. Provisional Patent Application No. 62/823,756 filed Mar. 26, 2019. The subject matter of this earlier-filed application is hereby incorporated by reference in its entirety.

STATEMENT OF FEDERAL RIGHTS

The United States government has rights in this invention pursuant to Contract No. 89233218CNA000001 between the United States Department of Energy and Trial National Security, LLC for the operation of Los Alamos National Laboratory.

FIELD

The present invention generally relates to heat pipes, and more particularly, to a multi-directional heat pipes.

BACKGROUND

Current heat pipe reactor cores (hereinafter "reactor core") have a single heat addition zone with heat pipes projecting from one or two faces of the reactor core to a condenser. This configuration limits the maximum achievable power out of the reactor core.

A dual condenser heat pipe offers enhanced core power density by doubling the cross-section effectively at the evaporator exits and reduces effective condenser lengths. This dual condenser configuration may not offer the maximum achievable power density for a given core volume and temperature difference across the volumetric heat source. For example, dual condenser configuration are limited to only a positive or negative x-direction.

To achieve higher dimensions (e.g., positive and/or negative x-direction, positive and/or negative y-direction, and positive and/or negative z-direction), an alternative multi-directional (heat pipe) reactor core may be more beneficial.

SUMMARY

Certain embodiments of the present invention may provide solutions to the problems and needs in the art that have not yet been fully identified, appreciated, or solved by current heat pipe technology. For example, some embodiments generally pertain to a multi-directional heat pipes. In certain embodiments, multi-directional heat pipes may be utilized with respect to reactor core technology.

In an embodiment, an apparatus includes a reactor core with one or more heat pipes passing through in an x-direction, one or more heat pipes passing through in a y-direction, and one or more heat pipes passing through in a z-direction. The one or more heat pipes passing through in x-direction, the y-direction, and the z-direction form the reactor core.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Dual condenser heat pipe reactor cores may be extended to higher dimensions. For example, instead of having condenser heat exchangers in the positive and negative horizontal directions, some embodiments may include heat pipes passing through a reactor core in the positive and/or negative x-directions, the positive and/or negative y-directions, and the positive and/or negative z-directions. It should be appreciated that heat pipes may be single condenser heat pipes or dual condenser heat pipes, and further, heat pipes in one of the axis directions may be omitted from the embodiments.

In another embodiment, condenser heat exchangers may be located in the positive and/or negative x-directions, positive and/or negative y-directions, and in certain embodiments, in the positive and/or negative z-directions when heat pipes are pumped assisted. By using pump assist for all heat pipes, the orthogonal directions need not be parallel or perpendicular to the gravity vector. These configurations may be compatible with drum, plate, and rod reactivity control techniques. These configurations may also be compatible with fast and moderated spectrum reactor types.

Figure 1A:
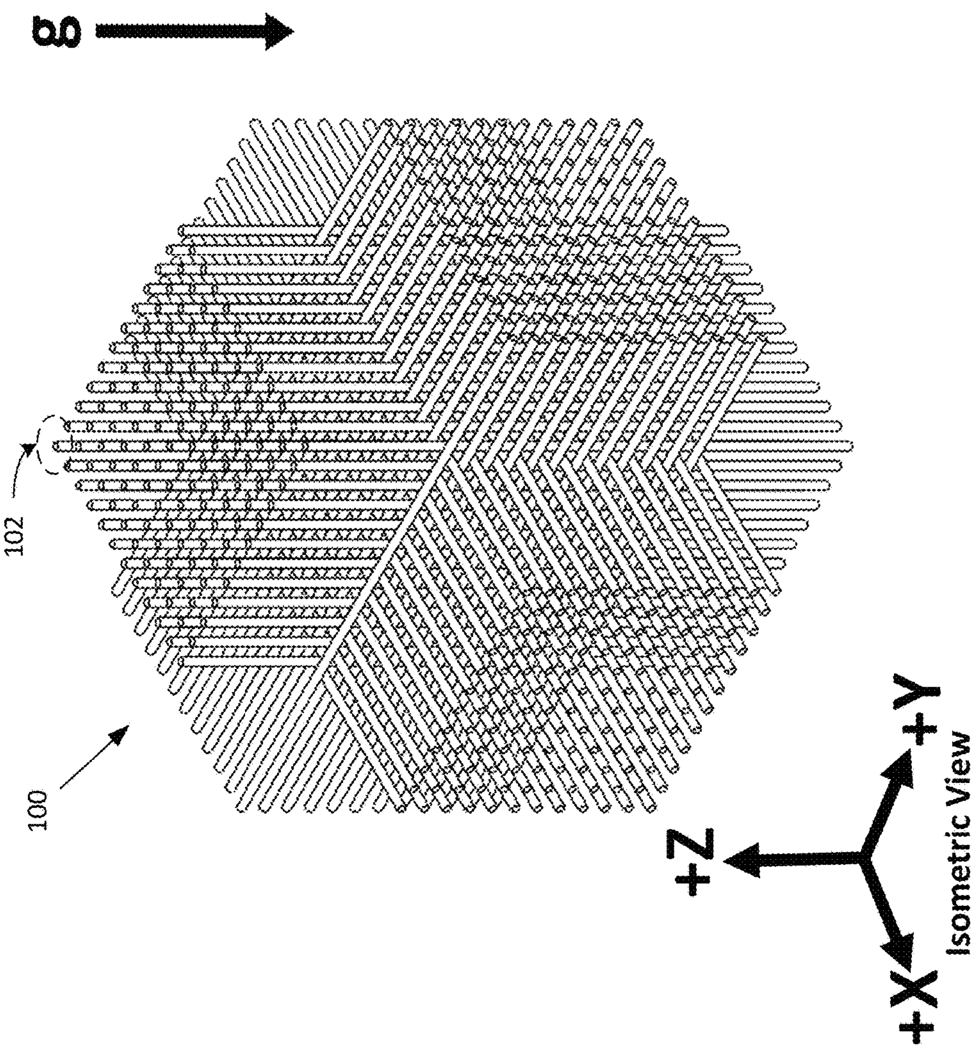
FIGS. 1A and 1B are diagrams illustrating multi-directional heat pipes (without a physical reactor core), according to an embodiment.
Figure 1B:
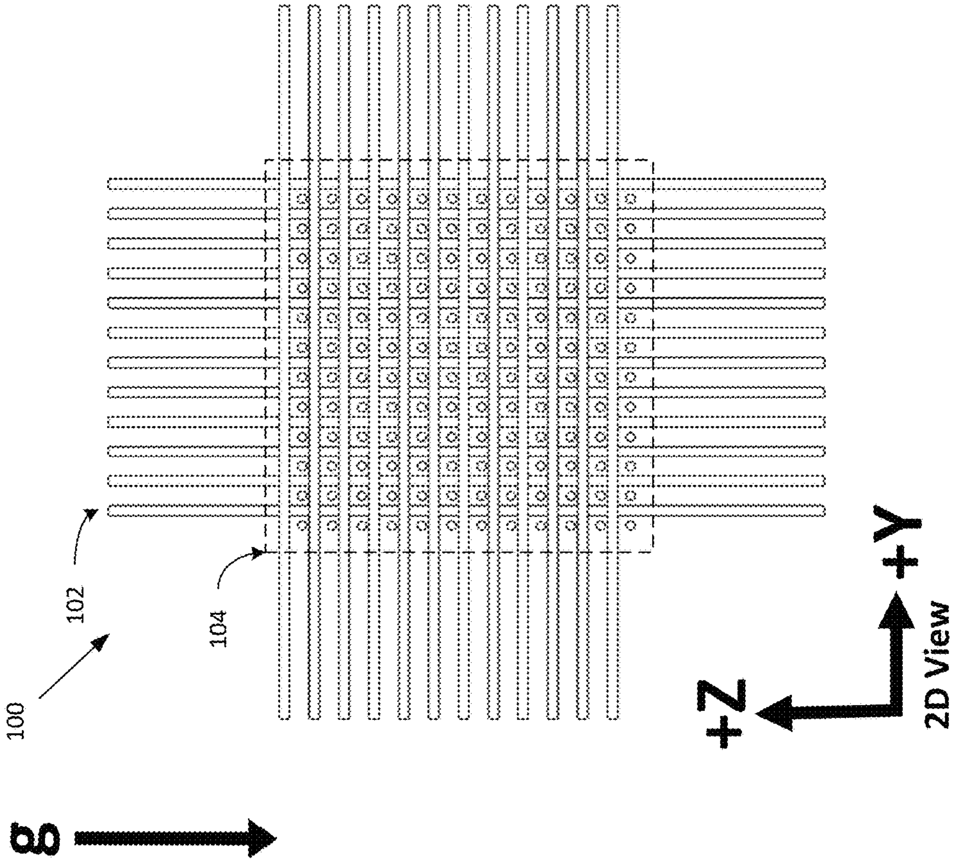

FIG. 1A is a diagram illustrating multi-directional heat pipes (without a physical reactor core) 100, according to an embodiment of the present invention. As shown in FIG. 1B, heat pipes 102 may form a reactor core 104 without a physical reactor core block or sphere. One would appreciate that the heat pipe can cool a volumetric heat source, such as fission heat, but may also cool other volumetric heat sources such as electrical heat from one or more microprocessors. In this embodiment, multi-directional heat pipe arrays may remove heat from a distributed heat source to one or more condensers surrounding the distributed heat source. The distributed heat sources may be of any shape, e.g., block, sphere, etc. This embodiment may reduce the effective length of the heat pipes 102, increasing heat pipe capacity.

Figure 2A:
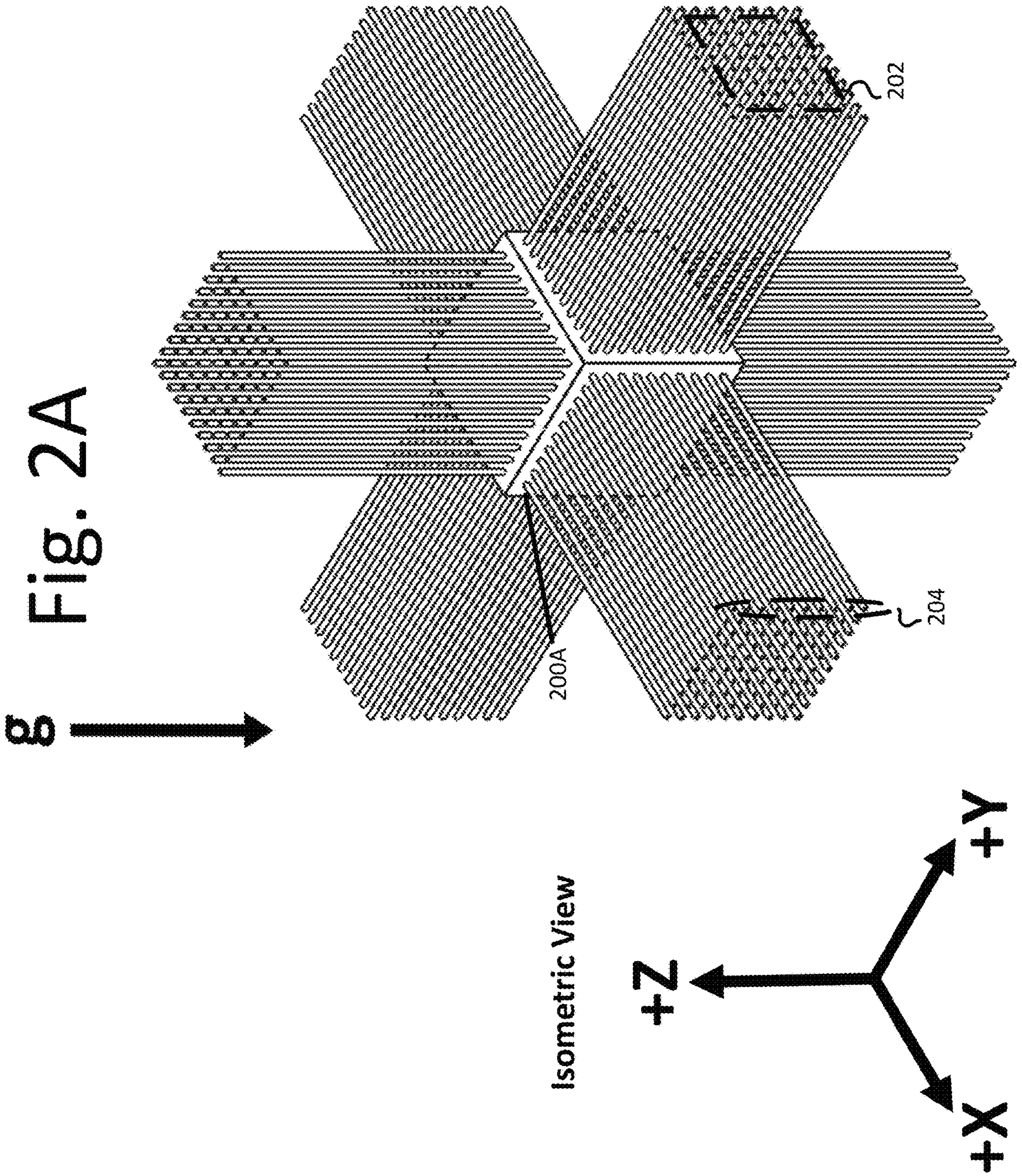
FIG. 2A is a diagram illustrating a perspective view of a reactor core block with heat pipes projecting in six different directions, according to an embodiment of the present invention.
Figure 2B:
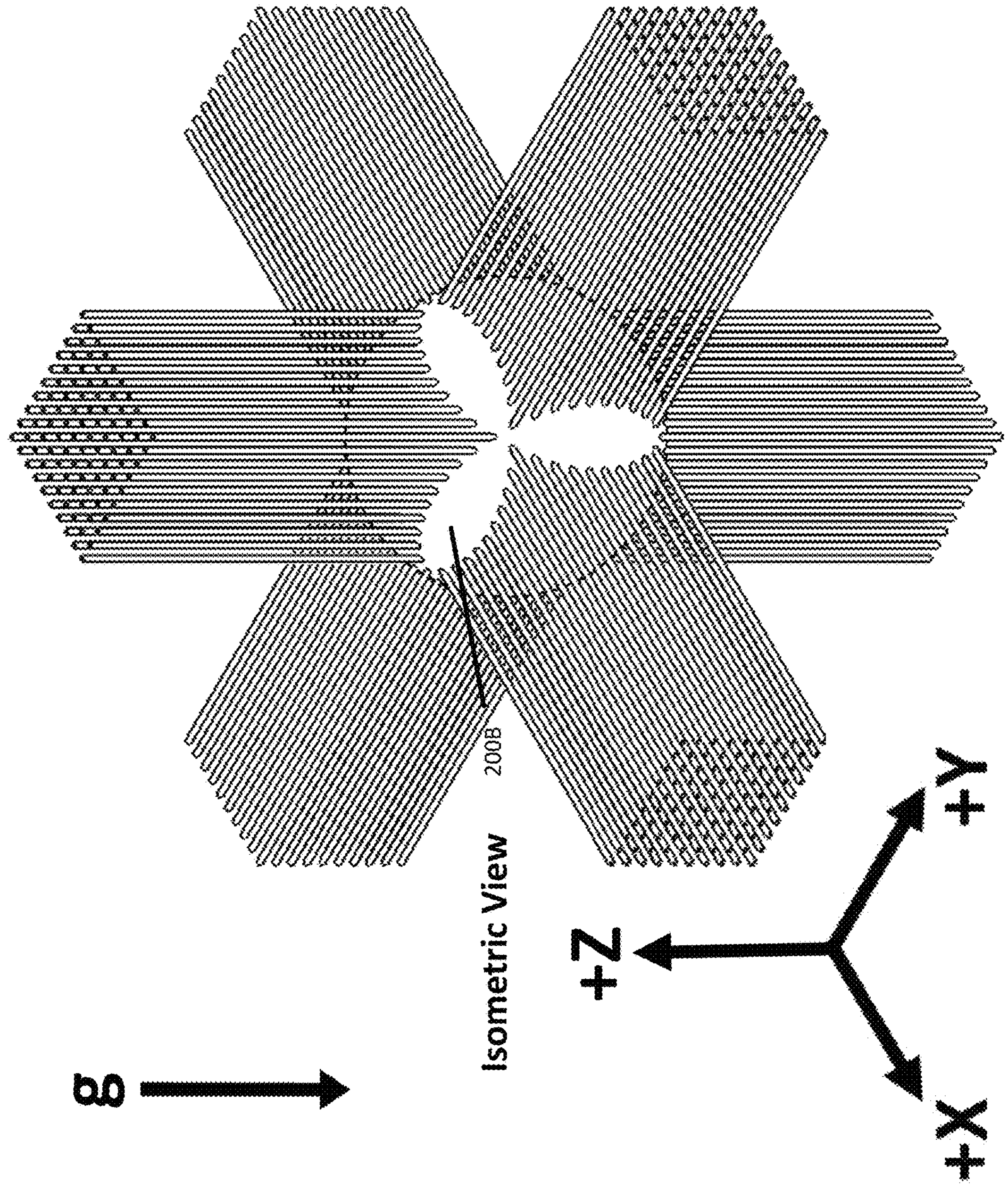
FIG. 2B is a diagram illustrating a perspective view of a spherical reactor core with heat pipes projecting in six different directions, according to an embodiment of the present invention.

FIG. 2A is a diagram illustrating a perspective view of a reactor core block 100A with heat pipes 102 projecting in six directions, according to an embodiment of the present invention. Although a reactor core block 200A is shown in FIG. 2A, other embodiments may include any shape, e.g., a spherically shaped reactor core with heat pipes projecting outward. See, for example, FIG. 2B, which is a diagram illustrating a perspective view of a spherical reactor core 200B with heat pipes projecting in six different directions, according to an embodiment of the present invention. By using a spherical reactor core 200B, a lower surface to volume ratio such as that shown in FIG. 2B (e.g., reactor core 200B), may achieve criticality with less nuclear material.

Returning to FIG. 2A, in this embodiment, heat pipes 202 project from all six faces of reactor core 200A. For example, as shown in FIG. 2A, heat pipes 202 projecting from the +Z face may operate in gravity assist mode. Heat pipes 202 projecting in the −Z direction may be counter gravity heat pipes. Alternatively, heat pipes 202 spanning the entire distance from −Z to +Z may be dual condenser pump assist heat pipes. In an embodiment, heat pipes 202 projecting across from −X to +X and −Y to +Y may be dual condenser heat pipes in the gravity neutral configuration.

Absent gravity, the configuration shown in FIG. 2A can increase the capacity of reactor core 200A by up to a factor of N in capillary limit, wherein N depends on the condenser coupling to the ultimate heat sink. However, this may change depending on the configuration of reactor core 200A.

Figure 2C:
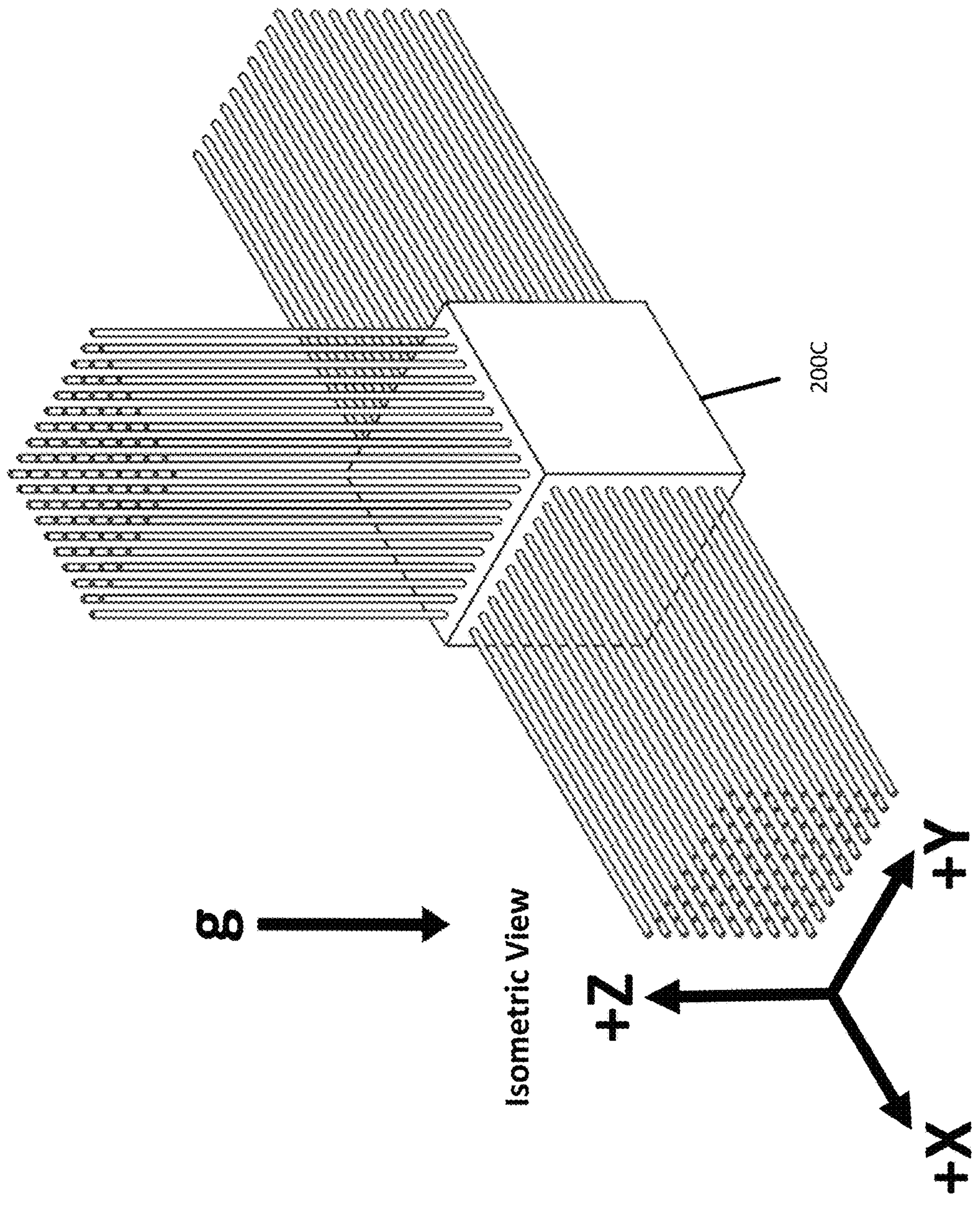
FIG. 2C is a diagram illustrating a perspective view of a reactor core block with heat pipes projecting in three different directions, according to an embodiment of the present invention.

In another embodiment, such as that shown in FIG. 2C, a diagram illustrating a perspective view of a reactor core block 200C with heat pipes projecting in three different directions is shown, according to an embodiment of the present invention. In this embodiment, heat pipes in the + and −X direction operate in a dual condenser mode. By operating in the dual condenser mode, reactor core 200C operates up to a factor of 4 greater capacity in terms of capillary limit. Further, heat pipes projecting from +Z axis are thermosyphons that further remove heat from reactor core 200C and increase reactor core's 200C capacity. Alternatively, the +Z axis heat pipes (or thermosyphons) are used for independent decay heat removal.

Figure 2D:
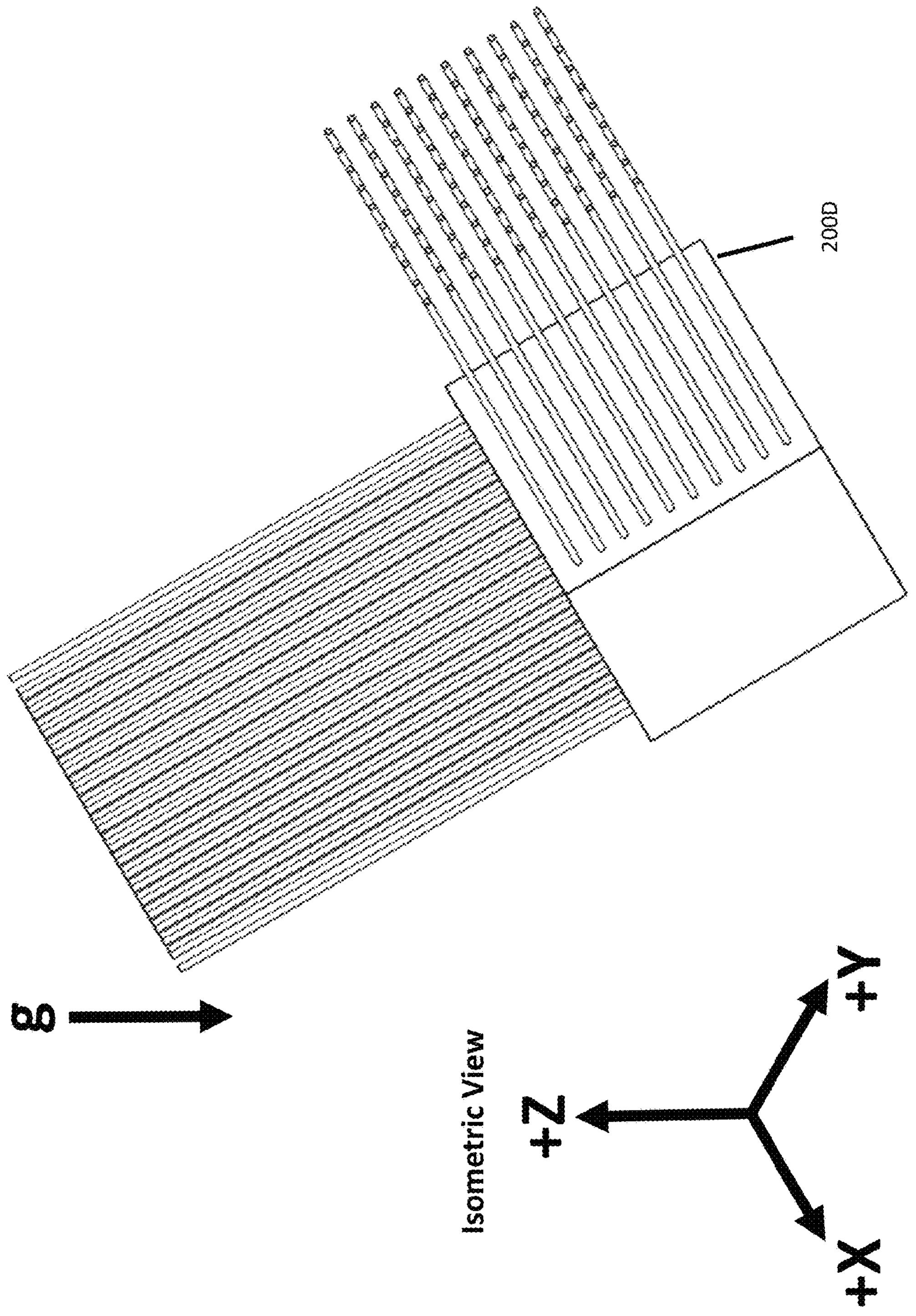
FIG. 2D is a diagram illustrating a perspective view of a reactor core block with heat pipes projecting in two different directions, according to an embodiment of the present invention.

In yet another embodiment, FIG. 2D is a diagram illustrating a perspective view of a reactor core block 200D with heat pipes (thermosyphons) projecting in two different directions above (or from) reactor core block 200D, according to an embodiment of the present invention. In this embodiment, when symmetrically oriented heat pipe arrays are at 45 degrees with respect to the horizontal direction. With this configuration, there is an increase in heat exchanger cross-sectional area by 2. Alternatively, thermosyphons may be made shorter due to the availability of the two faces.

Figure 2E:
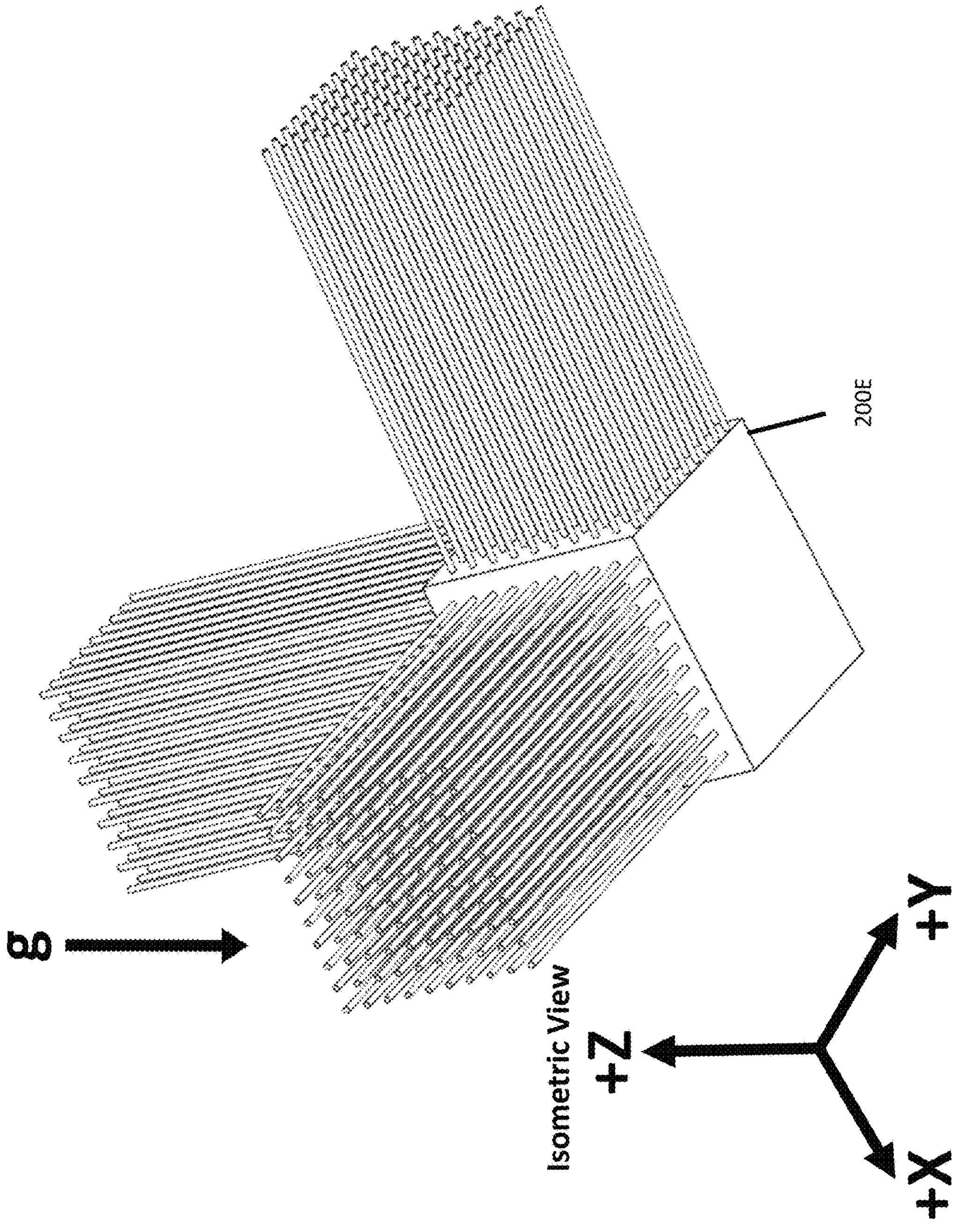
FIG. 2E is a diagram illustrating a perspective view of a reactor core block with heat pipes projecting in three different directions, according to an embodiment of the present invention.

FIG. 2E is a diagram illustrating a perspective view of a reactor core block 200E with heat pipes projecting in three different directions, according to an embodiment of the present invention. In this embodiment, a corner of reactor core block 200E faces zenith and each of three heat pipes arrays is oriented at 35.3 degrees with respect to the horizontal direction. With this configuration, there is an increase in heat exchanger cross-sectional area by 3. Alternatively, thermosyphons may be made shorter due to the availability of the three faces.

Figure 2F:
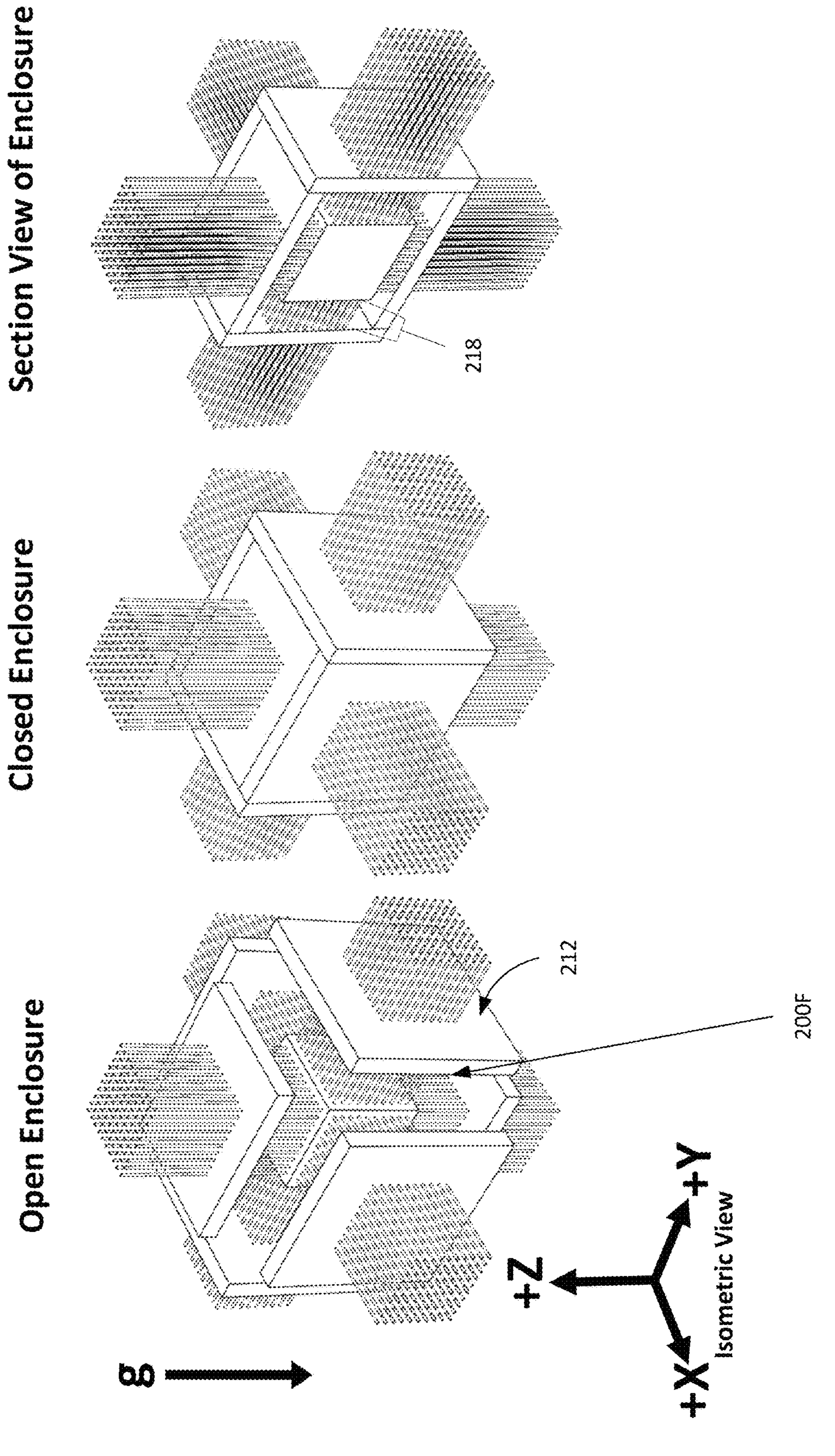
FIG. 2F is a diagram illustrating a perspective view of an enclosed reactor core block with heat pipes projecting in six different directions, according to an embodiment of the present invention.

FIG. 2F is a diagram illustrating a perspective view of an enclosed reactor core block 200F with heat pipes projecting in six different directions, according to an embodiment of the present invention. In this embodiment, plates (reflector plates) 212 enclose reactor core block 200F. In FIG. 1F, reactivity may be controlled by the use of plates 212. Although there is a gap 218 shown between plates 212 and reactor core block 200F, gap 218 may vary depending on the configuration of reactor core block 200F.

In some embodiments, plates 212 may be kept open with a spring (not shown) and moved inward by an electromagnet (not shown) in a normally open configuration. In this embodiment, plates 212 are normally away from reactor core block 200F, so reactor core block 200F is subcritical. Only by energizing electromagnet, plates 212 move inward to place reactor core block 200F in a critical configuration.

Figure 2G:
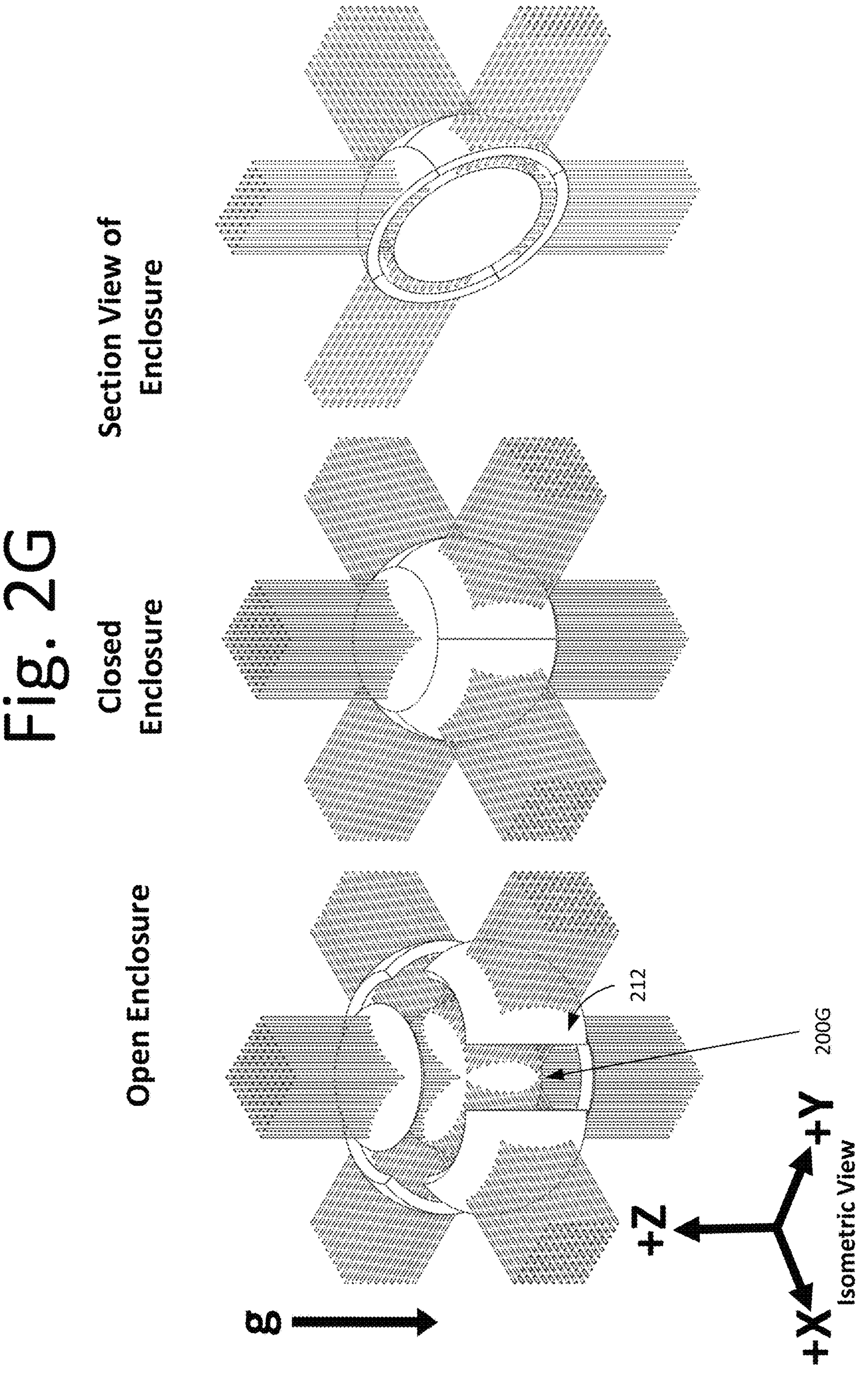
FIG. 2G is a diagram illustrating a perspective view of an enclosed spherical reactor core with heat pipes projecting in six different directions, according to an embodiment of the present invention.

FIG. 2G is a diagram illustrating a perspective view of an enclosed spherical reactor core 200G with heat pipes projecting in six different directions, according to an embodiment of the present invention. In this embodiment, plates 212 are configured to spherical shape of reactor core 200F. This embodiment minimizes surface to volume ratio, allowing for minimal requirements for nuclear fuel.

Figure 2H:
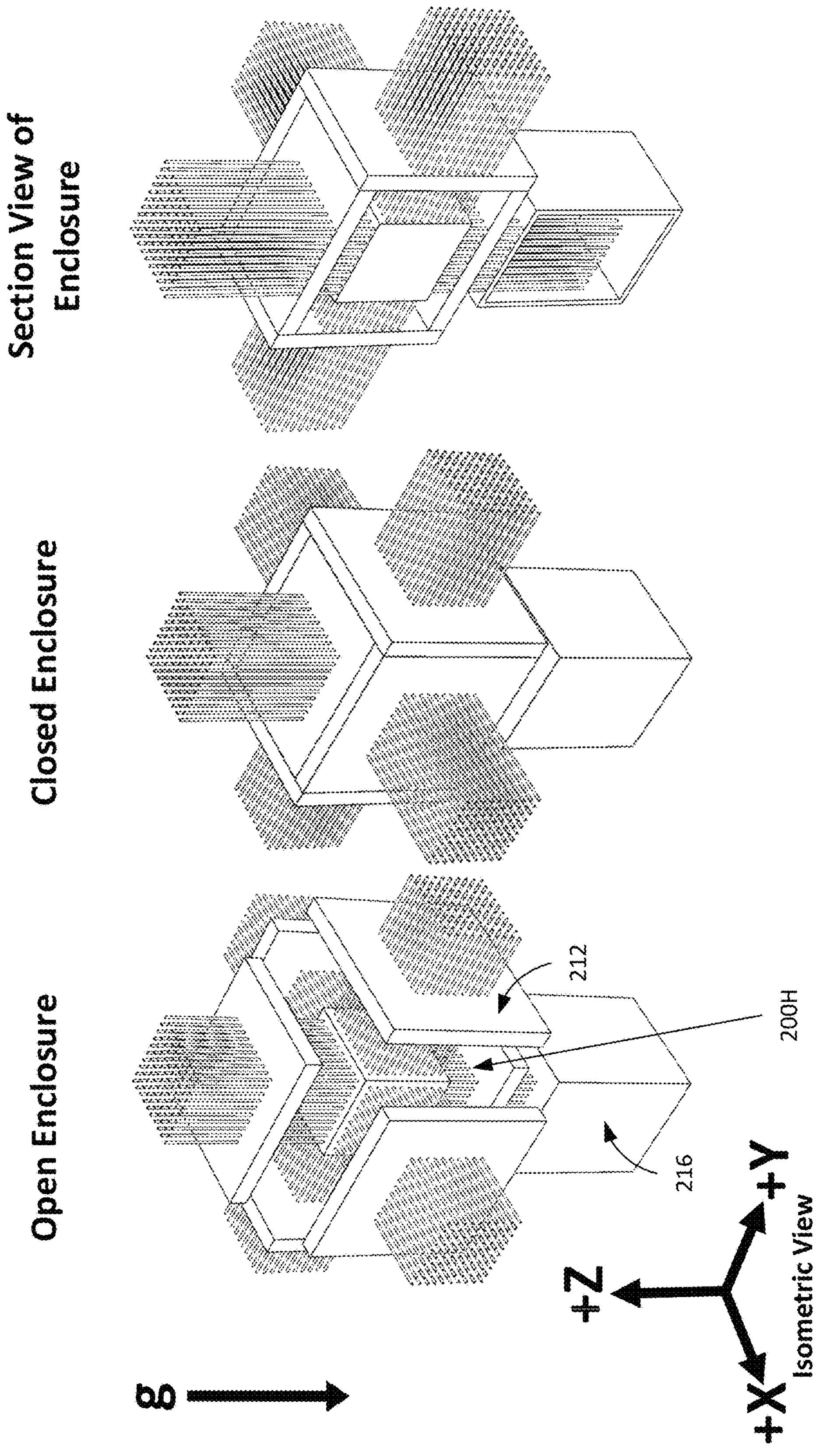
FIG. 2H is a diagram illustrating a perspective view of an enclosed reactor core block with heat pipes projecting out from one side of reactor core block into a heat exchanger, according to an embodiment of the present invention.

FIG. 2H is a diagram illustrating a perspective view of an enclosed reactor core block 200H with heat pipes projecting out from one side of reactor core block into a heat exchanger 216, according to an embodiment of the present invention. Although heat pipes are shown to project into heat exchanger 216 from one of the faces of reactor core block 200H; in other embodiments, heat pipes may project into corresponding heat exchangers from one or more respective faces of reactor core block 200H. This embodiment illustrates heat exchanger placement and heat exchanger at one or more faces of reactor core block 200H to offer reduction in heat pipe effective length. This configuration allows routing of heat exchanger working fluid to one or more heat exchangers in parallel through a manifold.

Figure 2I:
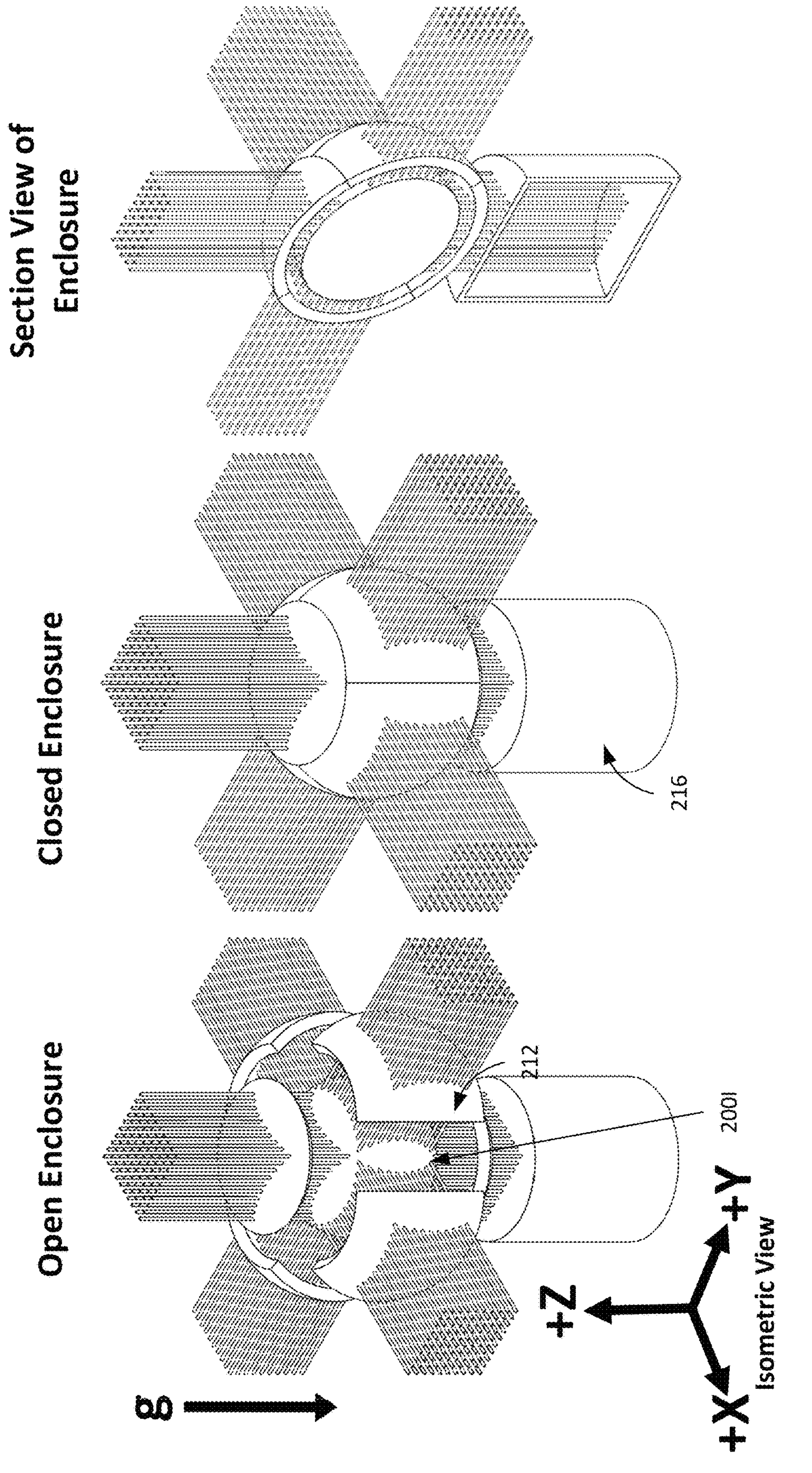
FIG. 2I is a diagram illustrating a perspective view of an enclosed spherical reactor core block with heat pipes projecting out from one side of spherical reactor core into a heat exchanger, according to an embodiment of the present invention.

FIG. 2I is a diagram illustrating a perspective view of an enclosed spherical reactor core block 200I with heat pipes projecting out from one side of spherical reactor core into a heat exchanger, according to an embodiment of the present invention. This embodiment may include similar features (e.g., plates 212 and heat exchangers 216) as those discussed above with respect to FIG. 2H.

Returning to FIG. 2A (for purposes of explanation), in an embodiment, heat pipes 202, either dual condenser or single condenser, pass through a reactor core block 200A in ±x directions, ±y directions, and ±z directions.

Figure 3:
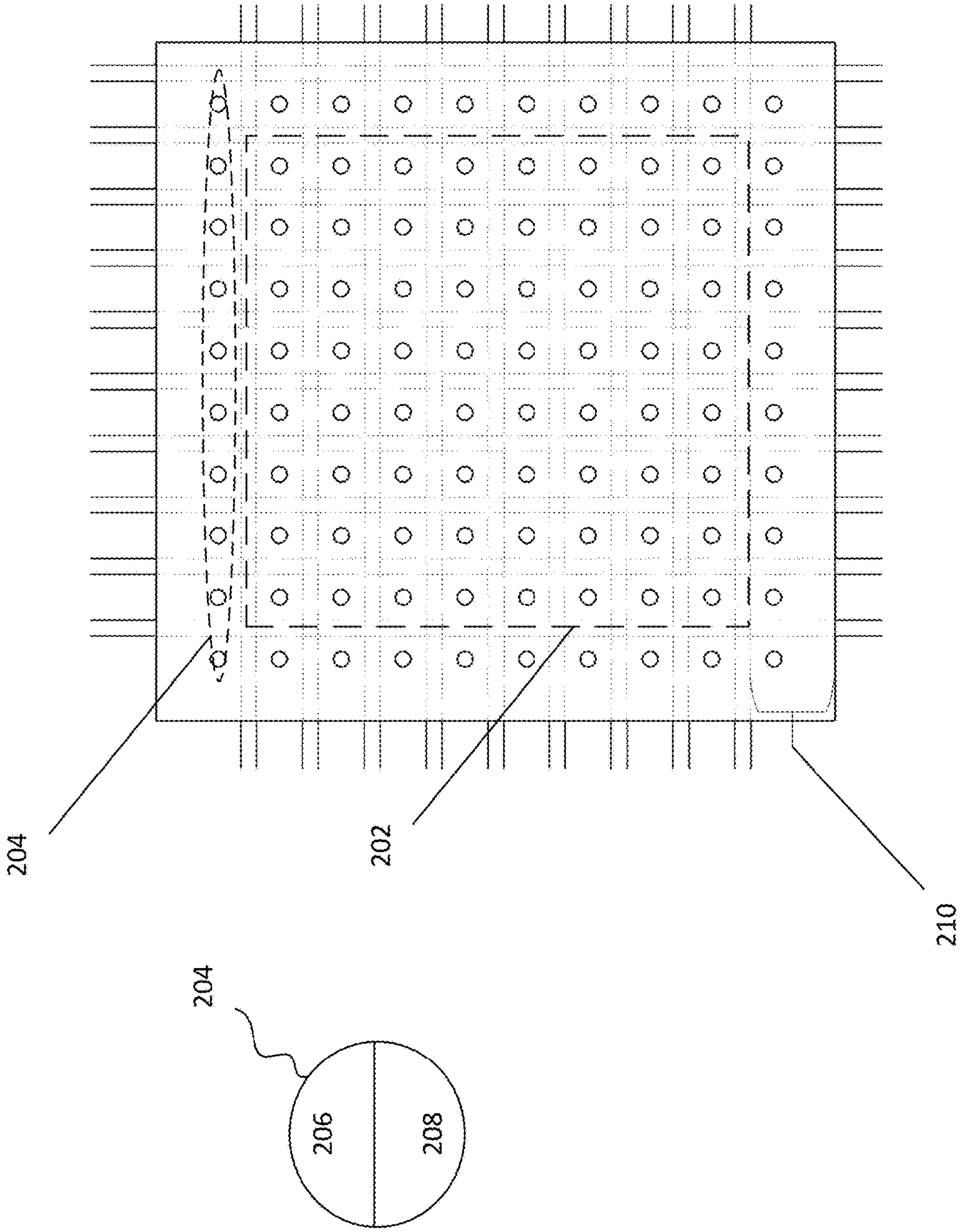
FIG. 3 is a diagram illustrating a cross-section view of a reactor core block, according to an embodiment of the present invention.

Rotating rods 204 are placed on the periphery of reactor core 200A. In some embodiments, rotating rods 204 may contain a reflector 206 on one side and an absorber 208 on the other side. See, for example, FIG. 3. Also, in some embodiments, rotating rods 204 may be rotated for reactor control with reflector 206 facing inward to increase K Effective (effective neutron multiplication factor—$K_{Eff}$). When absorber 208 faces inward, the effective neutron multiplication factor decreases. In some other embodiments, rotating rods 204 may be placed in multiple rows along the periphery. In still other embodiments, plates may be used on the outside of reactor core block 200A in conjunction with rotating rods 204 to control $K_{Eff}$ (reactivity).

Edges of reactor core 200A may include reflector and/or moderating material 210. See, for example, FIG. 3. Reflector 210 may reflect neutrons inward to increase $K_{Eff}$ and moderating material may slow neutrons from fast to thermal spectrum.

Returning to FIG. 2A, −Z heat pipes may be actively pumped in certain embodiments to allow them to operate in a counter gravity configuration. The effect of this configuration is to increase heat pipe capacity in reactor core 200A and to minimize heat exchanger length (heat pipe condenser). +Z heat pipes may operate in a gravity assist configuration. ±X and ±Y heat pipes operate in a horizontal orientation in either a single side or dual configuration.

In another embodiment, reactor core 200A is rotated such that heat pipes 202 are at an angle with respect to a gravitational vector g. Heat pipes 202 facing in the +Z, −Y, and −X operate in a gravity assist orientation. Heat pipes 202 facing in the −Z, +Y, and +X operate in a counter gravity orientation. These heat pipes 202 in ±X may be in a single pumped heat pipe assembly in some embodiments. Similarly, heat pipes 202 in ±Y and ±Z may also be in a single pumped heat pipe assembly.

Further, as shown in FIG. 2A, heat pipes 202, which project out of reactor core 200A, are coupled to a heat exchanger (not shown).

Figure 4:
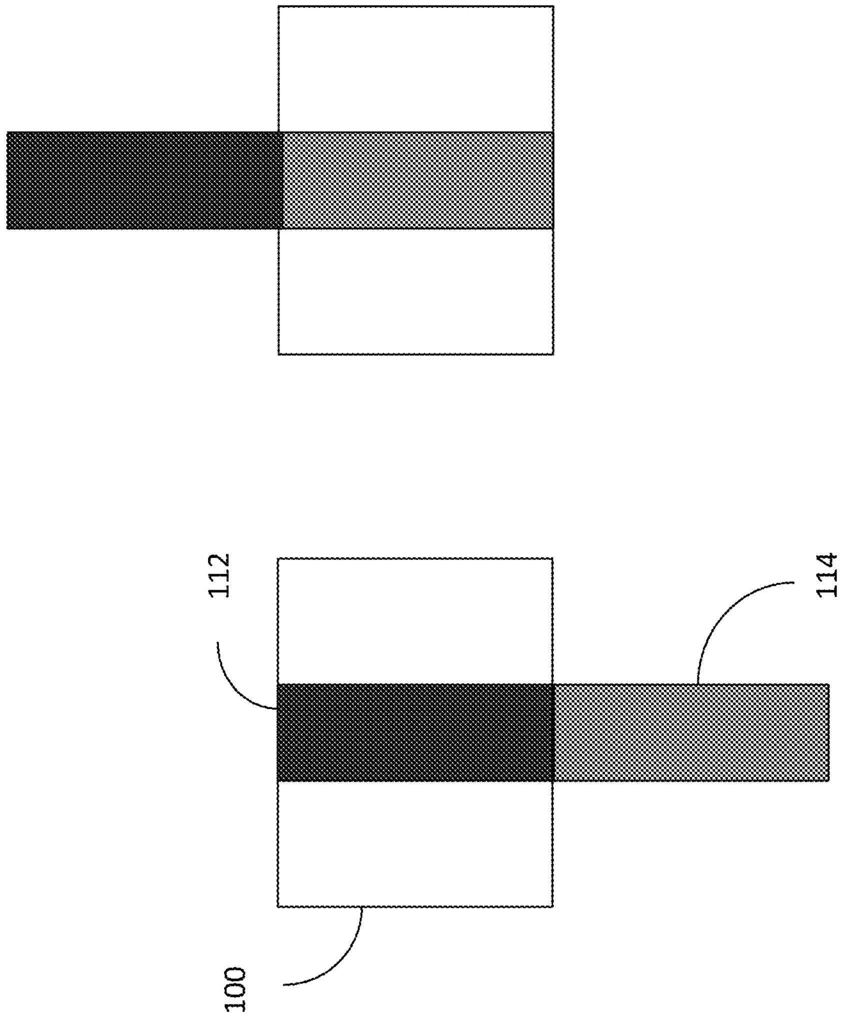
FIG. 4 is a diagram illustrating a reactor core block with a control rod/fuel monitor assembly, according to an embodiment of the present invention.

FIG. 4 is a diagram illustrating mobile control rods 112, according to an embodiment of the present invention. In this embodiment, mobile control rods 112 situated above reactor core 100, which are attached to fuel and/or fuel moderator 114. To shut down reactor core, control rods 112 are moved downward to replace fuel and/or fuel moderators 114, which were in reactor core 100. In some embodiments, reactor core 100 includes fuel and heat pipes, and/or also include moderators.

Some embodiments that include a dual condenser heat pipe provides enhanced core power density by doubling the cross-section of the reactor core at exits of the evaporators. Some of these embodiments may also reduce the effective length of the condensers.

Some embodiments may include numerous configurations. For example, a stationary (reactor core) block may include fuel, and/or moderator/fuel, with heat pipes passing through the reactor core in the positive and negative x-direction, y-direction, and z-direction.

An advantage of the present invention for removing heat from a volumetrically heated source is a reduction in the temperature drop from the center of the volumetrically heated source to the heat pipe surface. The temperature drop across a cylinder is of order $$\Delta T \sim \frac{q''' r^2}{4\pi k},$$

where ΔT is the temperature difference between the center of the volumetric heat source and the heat pipe, q''' is the volumetric heating rate, r is the distance from the center of the volumetric heat source and the heat pipe, and k is the thermal conductivity of the volumetric heat source. This represents the temperature difference across a two dimensional array as found in a conventional heat pipe reactor core. For a multi-dimensional core heat moves in up to six directions from the spherical volumetrically heated source with a temperature drop of order $$\Delta T \sim \frac{q''' r^2}{6\pi k}.$$

This represents the temperature difference across a three dimensional array as found in a present invention (e.g., FIG. 1A).

In some embodiments, additive manufacturing may be used to fabricate the multidirectional heat pipes with the core block.

Some embodiments may be directed to a reactor core with one or more heat pipes passing through in an x-direction, one or more heat pipes passing through in a y-direction, and one or more heat pipes passing through in a z-direction. The one or more heat pipes passing through in the z-direction are pumped heat pipes.

In some further embodiments, a set of the one or more heat pipes in the z-direction comprises one or more condensers, one or more absorbers, or both.

Also, in some further embodiments, a set of the one or more heat pipes in the z-direction comprises one or more moderators.

In yet some further embodiments, a set of the one or more heat pipes in the z-direction comprises one or more fuel rods.

In another embodiment, the one or more heat pipes in the x-direction and the one or more heat pipes in the y-direction are actively pumped controlled.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:

a reactor core, wherein the reactor core comprises:

one or more first heat pipes, and one or more second heat pipes, wherein the one or more first heat pipes and the one or more second heat pipes each comprise an evaporator section disposed within the reactor core, wherein the one or more first heat pipes pass through a first external face of the reactor core and the one or more second heat pipes pass through a second external face of the reactor core, wherein the one or more first heat pipes passing through the first external face and the one or more second heat pipes passing through the second external face of the reactor core are angled with respect to each other and to a gravity vector, and wherein the one or more first heat pipes and the one or more second heat pipes are gravity assist heat pipes.

2. The apparatus of claim 1, wherein the one or more first heat pipes and the one or more second heat pipes each comprises an elongated body defining a first end and a second end opposite the first end, wherein the first end of each heat pipe is disposed externally of the reactor core, and wherein each heat pipe comprises a condenser section disposed proximate the first end of the heat pipe.

3. The apparatus of claim 1, wherein the first external face and the second external face of the reactor core are orthogonal with respect to each other.

4. The apparatus of claim 1, further comprising control rods that are configured to be inserted into the reactor core.

5. The apparatus of claim 1, wherein the one or more first heat pipes and the one or more second heat pipes each comprises an elongated body defining a first end and a second end opposite the first end, wherein the first end and the second end of each heat pipe is disposed externally of the reactor core, and wherein the one or more first heat pipes and the one or more second heat pipes are dual condenser heat pipes, such that each heat pipe comprises a first condenser section disposed proximate the first end of the heat pipe and a second condenser section disposed proximate the second end of the heat pipe.

6. The apparatus of claim 5, wherein the dual condenser heat pipes are configured to reduce a length of one or more of the condenser sections as compared to a single condenser heat pipe.

* * * * *